United States Patent [19]

Yoshida

[11] Patent Number: 4,510,747
[45] Date of Patent: Apr. 16, 1985

[54] LOCKUP CONTROL DEVICE FOR A TORQUE CONVERTER

[75] Inventor: Ryo Yoshida, Ikeda, Japan

[73] Assignee: Daihatsu Motor Company Limited, Osaka, Japan

[21] Appl. No.: 324,052

[22] Filed: Nov. 23, 1981

[30] Foreign Application Priority Data

Dec. 12, 1980 [JP] Japan .................................. 55-176184
Dec. 28, 1980 [JP] Japan .................................. 55-188086

[51] Int. Cl.³ ............................................. F16D 33/00
[52] U.S. Cl. ...................................... 60/343; 74/732; 74/866; 192/3.29; 192/3.31
[58] Field of Search ................. 192/0.07, 0.075, 0.076, 192/0.096, 3.28, 3.29, 3.3, 3.31; 74/866, 865, 752 A, 732; 60/343, 355

[56] References Cited

U.S. PATENT DOCUMENTS

| 2,676,497 | 4/1954 | Ahlen | 60/343 X |
|---|---|---|---|
| 2,722,133 | 11/1955 | Lapsley | 74/732 |
| 3,068,974 | 12/1962 | Jandasek | 192/3.31 |
| 3,485,328 | 12/1969 | Bilton | 192/3.3 |
| 3,688,609 | 9/1972 | Friedline | 74/866 |
| 3,693,478 | 9/1972 | Malloy | 192/3.31 |
| 3,824,878 | 7/1974 | Grosseau | 74/866 |
| 4,318,312 | 3/1982 | Morimoto | 74/866 |

FOREIGN PATENT DOCUMENTS

| 1134598 | 9/1962 | Fed. Rep. of Germany . | |
| 1226888 | 10/1966 | Fed. Rep. of Germany . | |
| 2131631 | 12/1972 | Fed. Rep. of Germany . | |
| 2853115 | 6/1980 | Fed. Rep. of Germany . | |
| 2437317 | 4/1980 | France . | |
| 252659 | 1/1948 | Switzerland . | |
| 1194179 | 6/1970 | United Kingdom . | |
| 1207076 | 9/1970 | United Kingdom . | |
| 1573149 | 8/1980 | United Kingdom . | |
| 2088009 | 6/1982 | United Kingdom | 192/0.075 |
| 2089458 | 6/1982 | United Kingdom | 192/0.076 |

Primary Examiner—Stephen F. Husar
Attorney, Agent, or Firm—Stevens, Davis, Miller & Mosher

[57] ABSTRACT

A lockup control device for a torque converter, which is provided with a lockup clutch engageable to connect a pump at the torque converter directly with a turbine thereat and disengageable to release the direct connection of the pump and turbine, and with an actuating device comprising a car speed detector which detects car speed to output a plurality of car speed signals, a negative pressure detector which detects a suction pipe negative pressure to output a plurality of negative pressure signals, and an actuator operable in response to the car speed and negative pressure signals, so that, on a basis of the car speed and negative pressure signals output from the respective detectors, the clutch is engaged when the car speed is greater than or equal to a predetermined speed and the suction pipe negative pressure is greater than or equal to a predetermined pressure, and is disengaged when the car speed is less than the predetermined speed and the negative pressure is less than the predetermined pressure.

7 Claims, 12 Drawing Figures

LOCKUP CONTROL DEVICE FOR A TORQUE CONVERTER

FIELD OF THE INVENTION

This invention relates to a lockup control device for a torque converter, and more particularly to a lockup control device for a torque converter provided with a pump connected to an output shaft of an engine and a turbine connected to an input shaft of a transmission gear.

BACKGROUND OF THE INVENTION

Generally, a torque converter mainly comprises a pump, a turbine, and a stator provided therebetween, and is filled with a working oil, so that its eddy flows transmit a rotating force from the pump to the turbine.

When a ratio of rotational speed of the turbine to the pump is smaller, curved vanes of the stator change the direction of the working oil into a helping direction of rotation of the pump. Therefore, a ratio of torque of the turbine to that of the engine (the torque ratio) is increased by an assist of the stator.

On the contrary, the torque ratio, when the rotational speed ratio becomes larger, is reduced. When the rotational speed ratio exceeds, e.g., 0.8 through 0.85, the torque ratio decreases to 1 or less, thus deteriorating the efficiency of power transmission.

To remedy the above, a lockup control device has heretofore been proposed which comprises a lockup clutch incorporated in the torque converter, so that when the number of rotations of an input shaft connecting the turbine increases to enter into an area of the rotational speed ratio where the torque ratio is 1 or less, the lockup clutch is engaged to connect the pump directly with the turbine, and when in the area where the torque ratio is 1 or more, the clutch is disengaged to release the direct connection.

The conventional lockup control device, for example, detects car speed to engage or disengage the lockup clutch, but is unable to perform linear control with respect to a change of the rotational speed ratio. For example, even when a low car speed and a small number of rotations of the engine keep the torque ratio less than 1, no lockup control is carried out, thereby deteriorating the efficiency of power transmission which leads to a loss of efficiency and an increase in fuel expense.

SUMMARY OF THE INVENTION

A main object of the invention is to provide a lockup control device which performs a linear on-off control of the lockup under a characteristic approximate to a change in the rotational speed ratio and can restrict fuel consumption to a minimum.

Another object of the invention is to provide a lockup control device simple in construction and inexpensive to produce.

A basic idea of the invention is that a negative pressure in a suction pipe of an engine and a car speed are detected to carry out on-control of the lockup only when the car speed and negative pressure meet a predetermined condition based on a combination of the car speed and negative pressure.

The lockup control device of the invention comprises a lockup clutch for connecting the pump directly with the turbine at the torque converter, a clutch operating device provided with a control member for engaging or disengaging the clutch and an operating member for operating the control member, and an actuating device which electrically actuates the operating member. The actuating device is provided with a car speed detector which detects car speed and outputs a plurality of car speed signals, a negative pressure detector which detects a negative pressure in the suction pipe of an engine and outputs a plurality of negative pressure signals, and an actuating member which electrically operates, in response to the car speed signals and negative pressure signals output from both the detectors, to actuate the operating member, so that the clutch is engaged when the car speed is greater than or equal to a predetermined speed and the suction pipe negative pressure is greater than or equal to a predetermined pressure, and is disengaged when the car speed and suction pipe negative pressure are less than the predetermined speed and pressure respectively.

Therefore, the lockup control device of the invention can engage or disengage the lockup clutch at a rotational speed ratio approximately corresponding to that keeping the torque ratio at 1 or less, whereby it is possible to eliminate inconvenience such that the lockup is carried out in an area where the torque ratio is 1 or more and an increase of torque is performable, or not in an area where the torque ratio of 1 or less will cause a power transmission loss.

These and other objects of the invention will become more apparent in the detailed description and examples which follow.

BRIEF DESCRIPTION OF THE INVENTION

FIG. 1 is a partially omitted sectional view of an embodiment of a lockup control device of the invention, used in a torque converter in which a lockup and a clutch operating device are incorporated, and shows a power transmission as a whole, FIG. 2 is an enlarged sectional view of the lockup clutch in part, FIG. 3 is a schematic diagram exemplary of a car speed detector, FIG. 4 is a partially sectional view thereof, FIG. 5 is a schematic diagram exemplary of a negative pressure detector, FIG. 6 is an electric circuit diagram, FIG. 7 is a flow chart of controlling the lockup clutch, FIGS. 8 and 9 are explanatory graphs of working areas of on-off control for the lockup, FIG. 10 is an enlarged sectional view of a principal portion of a modified embodiment of the clutch operating device including an actuating device therefor, FIG. 11 is an enlarged sectional view of a directional control valve used in the FIG. 10 embodiment, and FIG. 12 is an enlarged sectional view of a principal portion of another modified embodiment of the clutch operating and actuating device therefor.

DETAILED DESCRIPTION OF THE INVENTION

Figure 1:
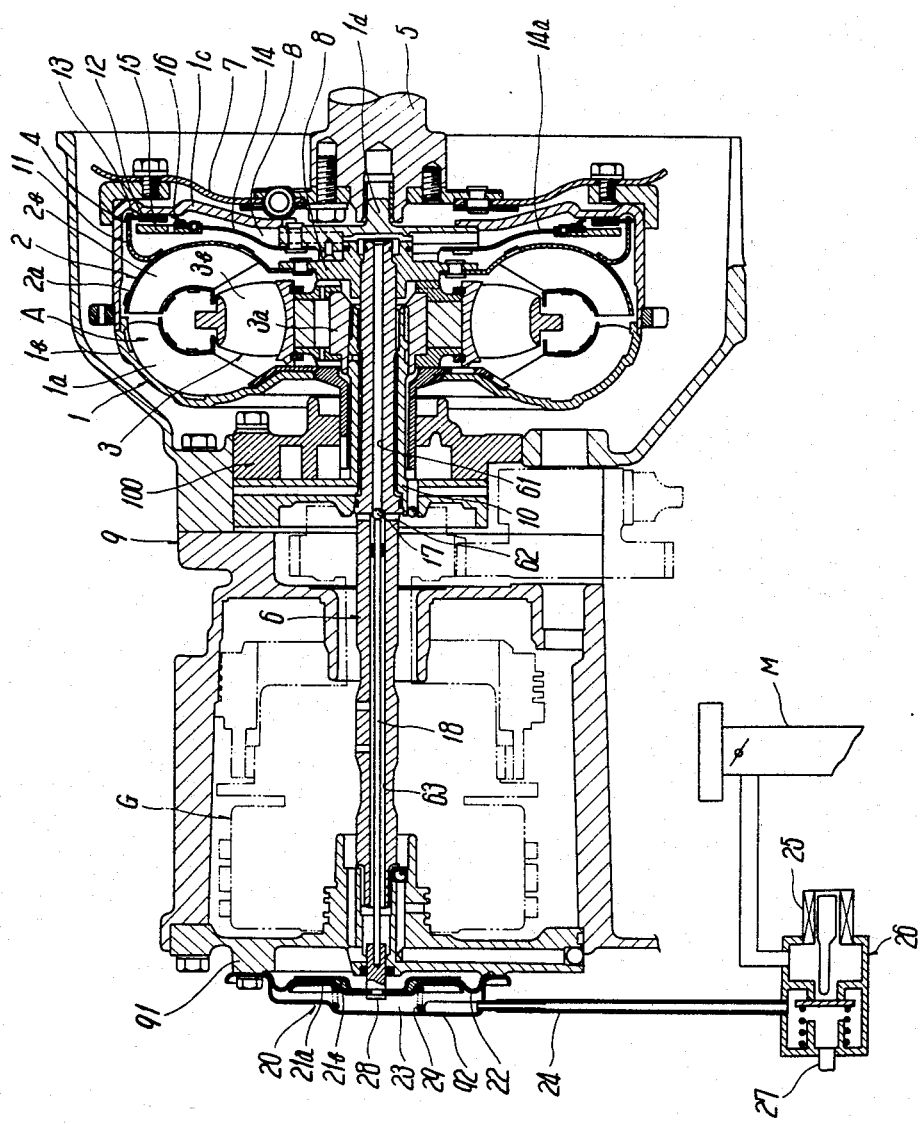

The lockup control device of the invention, as shown in FIG. 1, is used in a torque converter for an automobile.

The torque converter, as well-known, mainly comprises a pump 1, a turbine 2 and a stator 3, and is provided between a front cover 1c of pump 1 and the turbine 2 with a lockup clutch 4 to be discussed below.

The pump 1 comprises the front cover 1c and a pump shell 1b having a number of vanes 1a, the front cover 1c being fitted at its central boss 1d onto an axial end of an output shaft 5 of an engine (not shown) and fixed to a drive plate 7 fixed to the output shaft 5, the pump shell 1b being freely rotatably sleeved onto an input shaft 6 of a transmission gear G shown schematically by the dot-and-dash line in FIG. 1, so that the output shaft 5 rotates to turn the vanes 1a and pump shell 1b through the front cover 1c and drive plate 7.

The input shaft 6 is hollow, has at the center a low pressure oil passage 61 extending axially of the same, and extends at the foremost end toward the vicinity of front cover 1c, the extension spline-coupling with a hub 8 which carries the turbine 2.

The turbine 2 comprises a number of vanes 2b mounted on a shell 2a which is fixed at the center to the hub 8 separate from the shell 2a, by use of a fixing means, such as pins.

The stator 3 comprises a boss 3a and a number of vanes 3b provided at the outer periphery of boss 3a, the boss 3a housing therein a one-way clutch (not shown), the vanes 3b being disposed between the pump 1 and the turbine 2. Also, the boss 3a is supported in a stationary manner to a stator shaft 10 sleeved onto the input shaft 6.

In the above construction, when the output shaft 5 is driven to rotate the pump 1, a working oil in a back chamber A between the pump 1 and the turbine 2, flows along each inclined vane 2b at the turbine 2, thereby rotating the turbine 2. Then, the oil flows out of vanes 2b and is relayed by the vanes 3b at the stator 3 to return to the leading edges of vanes 1a at the pump 1. The oil changes the flowing direction by the vanes 1a, 2a and 3a and exerts a push to each vane, thereby giving torque to the pump 1, turbine 2, and stator 3.

An output torque given to the input shaft 6 from the turbine 2 is a sum of an input torque for driving the pump 1 and a torque given to the stator 3 from the working oil. When the rotational speed ratio is smaller and the oil largely changes the flowing direction, the stator torque is positive, so that the output torque becomes larger than the input torque, thereby enabling the torque to increase. On the contrary, when the rotational speed of turbine 2 becomes faster and the rotational speed ratio becomes larger, the oil changes the flowing direction to a lesser extent, and flows from the stator 3 to the turbine 2 when the rotational speed ratio exceeds a ratio of a certain limit, e.g., 0.8 to 0.85. Hence, the stator torque is negative to make the output torque smaller than the input torque.

Hence, the characteristic of a torque converter cannot be obtained in an area of rotational speed ratio where the torque does not increase and the torque ratio becomes smaller than 1, thus causing a power transmission loss.

The lockup clutch 4 connects the pump 1 directly with the turbine 2 to compensate the above loss, and a description of how this occurs now follows.

Figure 2:
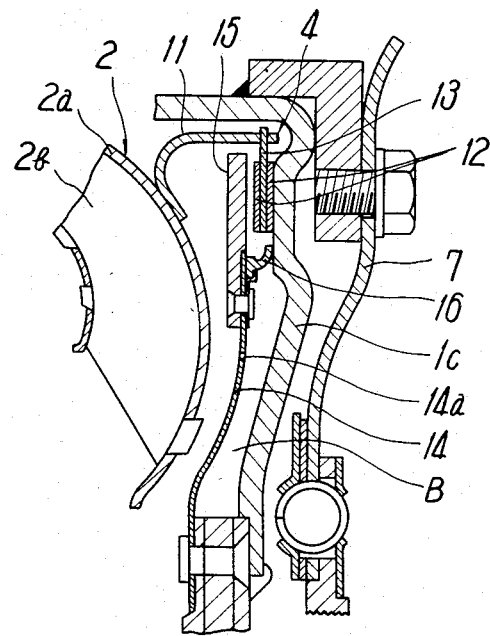

Referring to FIGS. 1 and 2, the lockup clutch 4 is so constructed that; a support cylinder 11 is provided at the shell 2a of turbine 2 and supports a clutch disc 13 having a linings 12 at both sides; a piston 14 of a flexible plate is fixed to the front cover 1c of pump 1; a pressure plate 15 opposite to the clutch disc 13 is mounted on the outer periphery of piston 14; a clutch control chamber B partitioned from the back chamber A and communicating with the low pressure oil passage 61 at the input shaft 6, is formed to be enclosed by the piston 14, front cover 1c, and a sealing member 16 fixed to the pressure plate 15; and orifices 14a are provided at the piston 14, through which the back chamber A communicates with the control chamber B.

The clutch disc 13 is supported axially movably with respect to the support cylinder 11, and the piston 14 is elastically deformable in itself and keeps the pressure plate 15 normally away from the disc 13. The piston 14, when oil pressure in the control chamber B lowers due to its communication with the low pressure line, biases the pressure plate 15 toward the front cover 1c, thereby sandwiching the disc 13 by the pressure plate 15 and front cover 1c, and when oil pressure in the control chamber B rises to be equal to that in the back chamber A, elastically restores to move the pressure plate 15 away from the disc 13, without requiring use of a return spring.

Thus, the piston 14, when the control chamber B is open to a low pressure line by operation of a clutch operating device to be hereinafter described and controlled in low pressure, operates as abovementioned to engage the lockup clutch 4 and directly connect the turbine 2 with the front cover 1c, and in turn with the pump 1.

The control chamber B, when closed by operation of the clutch operating device, is equalized in pressure to the back chamber A, causing the piston 14 to restore to move the pressure plate 15 away from the disc 13. Hence, the lockup clutch 4 is disengaged to release the direct coupling of turbine 2 with pump 1.

The aforesaid clutch operating device for the lockup clutch 4 serves to open or close the control chamber B with respect to the low pressure line and comprises a control member for engaging or disengaging the lockup clutch 4 and an operating member for operating the control member. The input shaft 6, as shown in FIG. 1, is provided at an axially intermediate portion with a drain 62 through which the oil passage 61 is open into the transmission case 9 and houses a check ball on-off valve 17 at a position corresponding to the drain 62, the on-off valve 17 switching the oil passage 61 to the drain 62. An operating rod 18 for on-off control of the valve 17 is inserted axially movably into an insertion bore 63 open rearwardly of the oil passage 61, and in turn, toward the transmission gear G, is opposite at the foremost end to the on-off valve 17, and couples at the rear end with a piston at an actuator 20 provided at a side cover 91 for the transmission case 9. In addition, in the above construction, the on-off valve 17 serves as the control member, and the operating rod 18 and actuator 20 as the operating member.

The actuator 20 in FIG. 1 is operative by use of a negative pressure in a suction pipe M of the engine and has the piston composed of a diaphragm 22, which forms a negative pressure chamber 23 connected to a negative pressure pipe 24. In the path of pipe 24 is interposed a negative pressure directional control valve 26 which directionally controls the negative pressure pipe 24 to communicate with a negative pressure area of the suction pipe M at the engine or with the atmosphere, by operation of a solenoid 25 constituting an actuating device to be discussed below.

In addition, the input shaft 6 in FIG. 1 extends in alignment in the axis with the output shaft 5 and carries on its extension the transmission gear G, and is supported at one axial end to the side cover 91 which has a box-like shaped case 92 open at one end, the open end holding the diaphragm 22 at the circumferential edge thereof.

The diaphragm 22 is sandwiched by a pair of reinforcements 21a and 21b which are connected to the operating rod 18 through a stem 28, and between the reinforcement 21a and the case 92 is interposed a spring 29 biasing the rod 18 always toward the on-off valve 17.

In the above construction, the solenoid 25 operates to allow the negative pressure chamber 23 to communicate with the negative pressure area of suction pipe M, then the diaphragm 22 moves leftwardly in FIG. 1 to move the operating rod 18 leftwardly, so that the on-off valve 17 acts to open the oil passage 61 to the drain 62. Hence, the oil pressure in the control chamber B communicating with the oil passage 61 lowers to engage the lockup clutch 4.

When the solenoid 25 operates to open the negative chamber 23 to the atmosphere through the negative pressure pipe 24 and an air-open conduit 27, a spring force of spring 29 and a restoring force of diaphragm 22 move rightwardly the rod 18, and in turn the on-off valve 17, thereby cutting off the communication between the oil passage 61 and the drain 62. Hence, the working oil in the back chamber A flows into the control chamber B through the orifices 14a to equalize both chambers A and B in oil pressure, thereby disengaging the lockup clutch 4 as described above.

This invention is directed further to the provision of an electrical actuating device for the operating member or operating rod 18 at the clutch operating device to thereby perform the on-off control of lockup at the torque converter constructed as abovementioned.

The electrical actuating device comprises a car speed detector 30 which detects car speed and outputs a plurality of car speed signals, a negative pressure detector 40 detecting a negative pressure in the suction pipe to output a plurality of negative pressure signals, and an actuating member which electrically operates in response to the car speed signals and negative pressure signals, output from the detectors 30 and 40, and actuates the actuator 20, and in turn the operating rod 18.

In addition, in the aforesaid embodiment, the negative pressure directional control valve 26 including the solenoid 25 serves as the actuating member.

The actuating member acts to engage the lockup clutch 4 when the car speed and negative pressure at the suction pipe are greater than or equal to a predetermined speed and pressure respectively, and disengage the clutch 4 when the car speed and negative pressure are less than the same.

Figure 3:
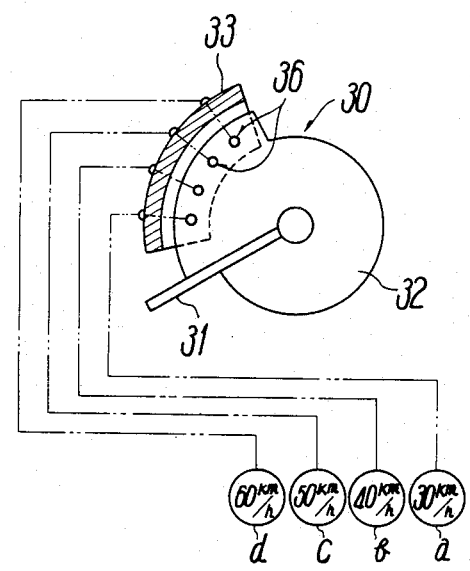
Figure 4:
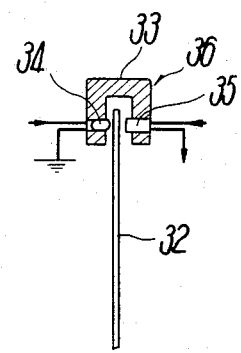

The car speed detector 30 employs, for example, a speed meter shown in FIG. 3, the speed meter having a detection plate 32 rotatable together with a pointer 31. A support 33 is mounted on a stationary member of the speed meter, is disposed within a rotary path of the plate 33, and carries a plurality of detector bodies 36 (four in the drawing) each comprising a light-emitting diode 34 and a phototransistor 35 opposite to each other, the detector bodies 36 being disposed corresponding to the predetermined car speeds, e.g., 30, 40, 50, and 60 km/h so that when car speed reaches the predetermined value, a car speed signal corresponding thereto is output from each output line a, b, c or d of each body 36.

Figure 5:
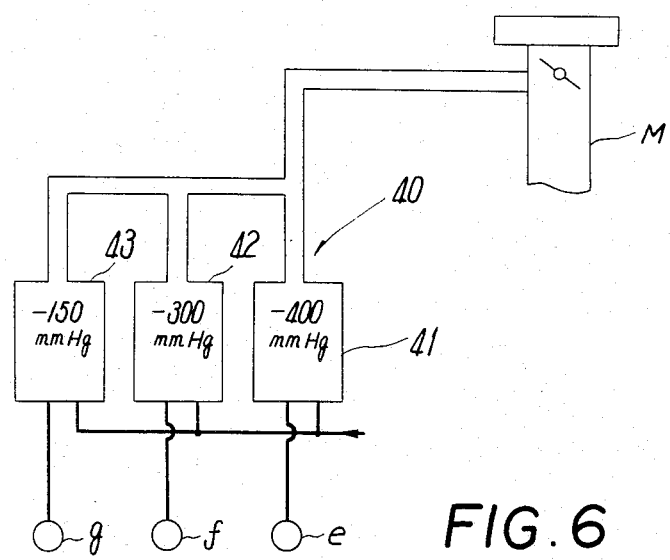

The negative pressure detector 40, as shown in FIG. 5, comprises a plurality of switches 41, 42, and 43 (three in the drawing), which are different in working negative pressure and operative at negative pressure of, for example, −400, −300, or −150 mm Hg and are connected to the negative pressure area of suction pipe M. Thus, when the suction pipe negative pressure reaches the predetermined value, a load signal corresponding thereto is output from the respective output lines e, f and g.

The respective output lines a through g at detectors 30 and 40 connect with a logic circuit 50 which outputs on-off control signals based on the car speed signal and negative pressure signal from each output line to thereby actuate the actuating member or solenoid 25 for engagement or disengagement of the clutch 4.

Figure 6:
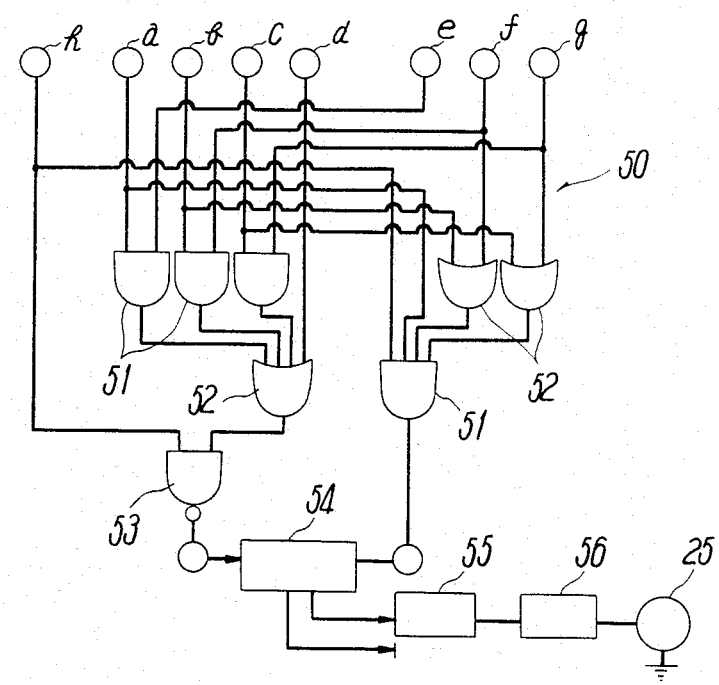

The logic circuit 50, as shown in FIG. 6, comprises combination of AND circuits 51, OR circuits 52 and NAND circuit 53, and a set-reset flip-flop 54 connected to output lines of the respective circuits, the flip-flop 54 being connected to the solenoid 25 by way of a power transistor 55 and a relay 56.

In FIG. 6, reference h designates an output line of a shift detector comprising a position switch (not shown) outputting a shift signal when a shift lever (not shown) operates to shift the transmission gear G into the drive range (D range).

The aforesaid shift detector, when used in the actuating device, mainly employs a semi-automatic transmission gear which transmits power at a fixed gear ratio and changes the gear ratio by shift control, but not a full-automatic one changeable of the gear ratio corresponding to car speed. In the case of using the full-automatic transmission gear, a shift switch outputting a shift signal, for example, at second in the drive range, is used and connected at the output line with the logic circuit 50.

Figure 7:
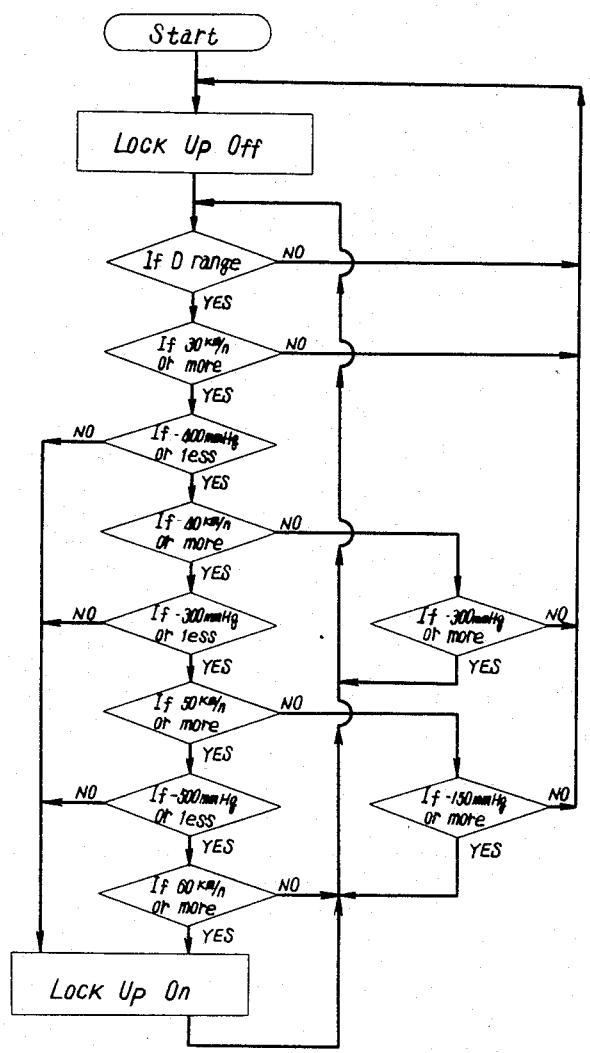

Next, the function of the lockup control device constructed as foregoing will be detailed in accordance with a flow chart shown in FIG. 7.

When the engine starts, the lockup clutch 4 is disengaged, and kept off so when the car is driven at low speed under 30 km/h it is evenly shifted in the drive range.

At the car speed over 30 km/h and suction pipe negative pressure over −400 mm Hg, an on-signal is output from the logic circuit 50 to engage the clutch 4. When the suction pipe negative pressure is smaller than −400 mm Hg, the lockup clutch 4 remains disengaged until the car speed exceeds 40 km/h.

When the suction pipe negative pressure is smaller than −400 mm Hg and car speed reaches 40 km/h, the logical circuit 50 outputs an on-signal to engage the clutch 4.

Figure 8:
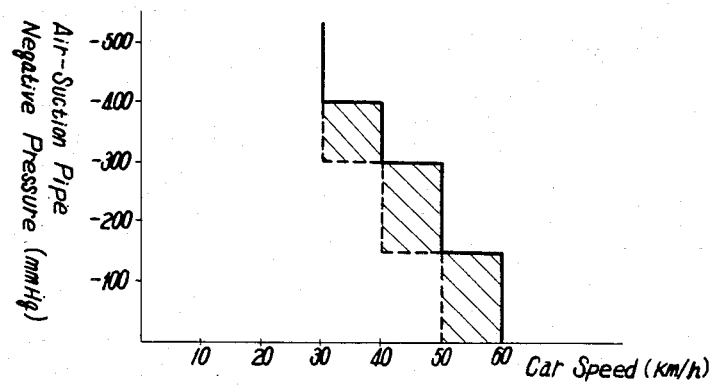
Figure 9:
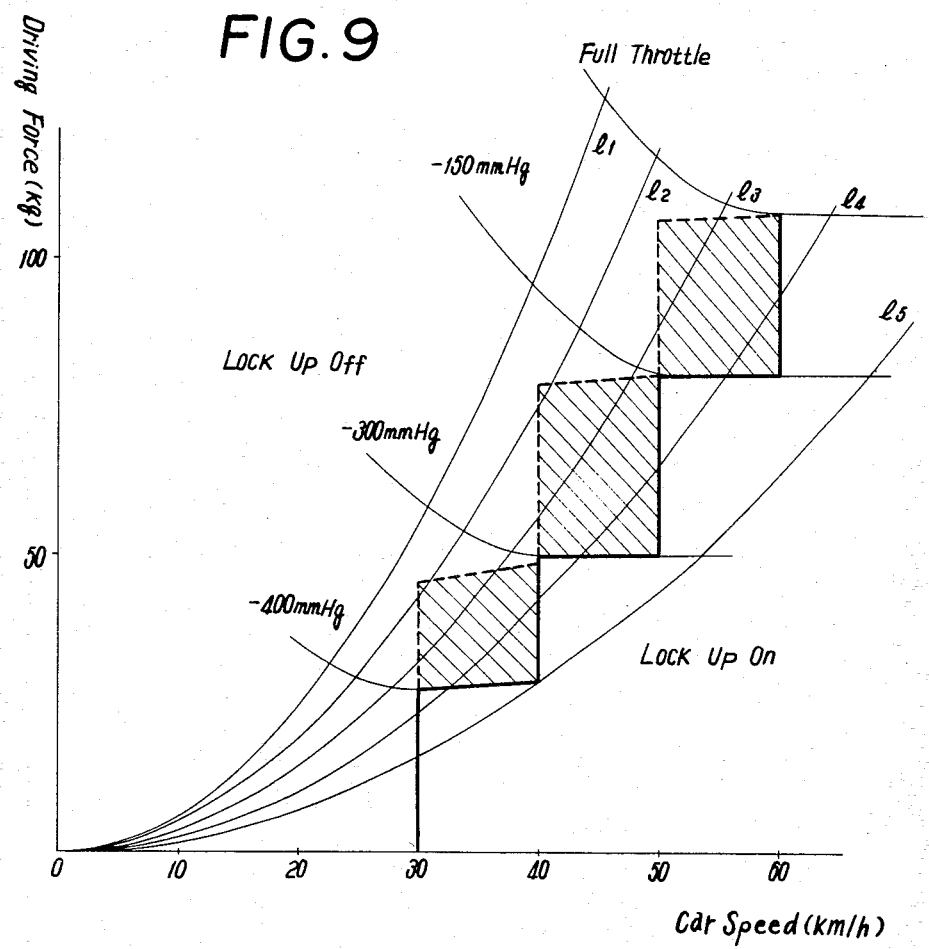

As seen from the above, when the car speed and suction pipe negative pressure are equal to or more than the predetermined speed and pressure respectively, the clutch 4 is engaged as shown in FIGS. 8 and 9.

In FIG. 9, the rotational speed ratios are represented by $l_1$ through $l_5$, where $l_1$ is 0.7; $l_2$, 0.75; $l_3$, 0.8; $l_4$, 0.85; and $l_5$, 0.9.

In the aforesaid embodiment, the clutch 4 is controlled on a basis of the ratio of 0.85 and engaged stepwise at both sides of the curve $l_4$ of the ratio of 0.85, but its reference value depends upon the characteristic of engine, and linear control of the lockup is possible by increasing the number of car speed signals and negative pressure signals.

On the contrary, the clutch 4 is disengaged, for example, when the car speed is lower than 30 km/h and the suction pipe negative pressure is of any value, or when the car speed is 30 km/h or more but not over 40 km/h and the negative pressure is lower than −400 mm Hg, or when the car speed is 40 km/h or more (but not over 50 km/h) and the negative pressure is lower than −300 mm Hg.

Referring to FIGS. 8 and 9, hysteresis ranges etched by obligue lines are provided for engagement and disengagement of clutch 4, so that the clutch 4, in transition from engagement to disengagement, is disengaged, for example, at the suction pipe negative pressure lower than −400 mm Hg when the car speed is equal to 30 km/h and the suction pipe negative pressure is lower than −400 mm Hg, or at a suction pipe negative pressure lower than −150 mm Hg when the car speed is equal to 40 km/h and the suction pipe negative pressure is lower than −300 mm Hg. The transition from disengagement to engagement of clutch 4 is the same as the above.

The aforesaid clutch operating device and actuating device described are merely exemplary of the invention and various modifications can be made. For example, the actuator 20 at the clutch operating device alternatively may utilize a line pressure of a lubricating oil given to the transmission gear G from an oil pump 100 (see FIG. 1) driven by the ratio of input shaft 6. Or, a solenoid, instead of the actuator, may be used and its movable iron core may be coupled directly with the operating rod 18.

Figure 10:
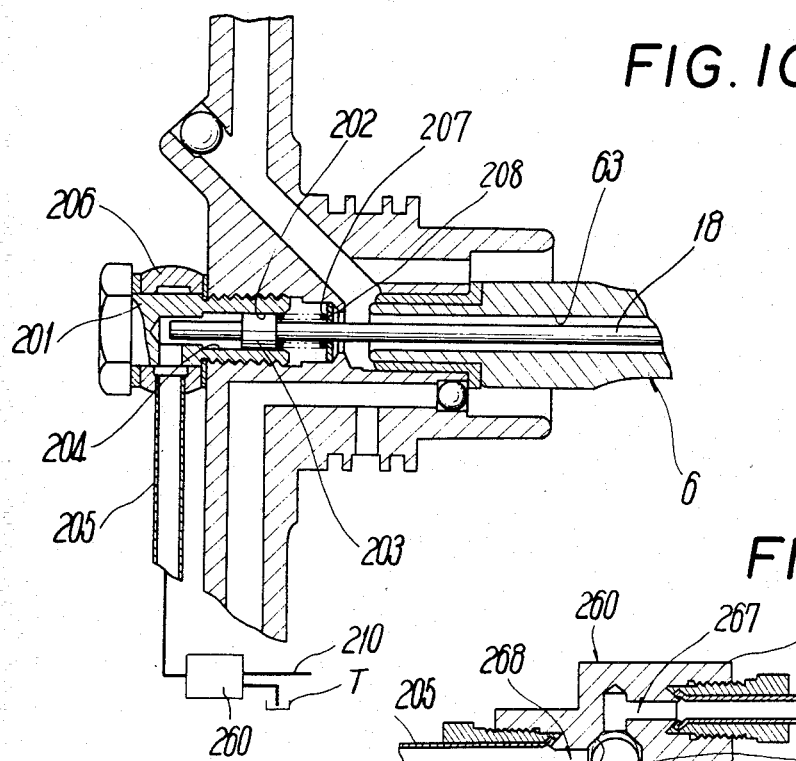
Figure 11:
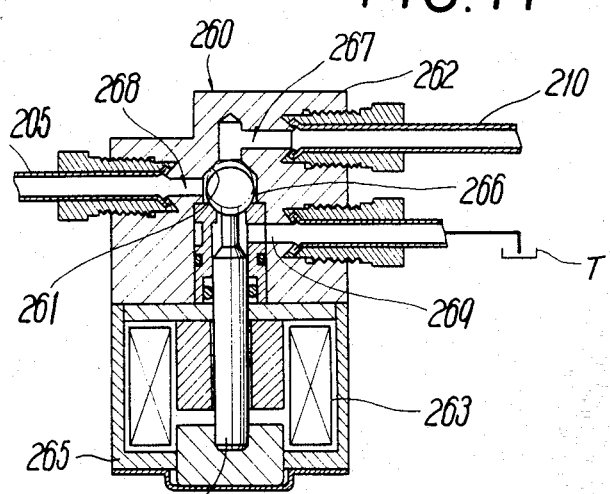

In a case of using the line pressure of the lubricating oil, a cylinder 201 having a piston room 202 coaxial with the input shaft 6 is screwably fixed to the side cover 91 as shown in FIG. 10, a piston 203 fixed to one end of operating rod 18 is housed movably in the piston room 202, a back chamber 204 of piston 203 is connected to a lubricating oil pressure line 210 in part through an oil passage 205 and a connector 206, and a solenoid operated directional control valve 260, as shown in FIG. 11, is provided at a connection of the oil passage 205 and oil pressure line 210.

The solenoid operated directional control valve 260, as shown in FIG. 11, comprises a valve body 262 having a valve chamber 261, and a casing 265 housing therein a solenoid 263 and a movable iron core 264, the valve chamber 261 housing therein a check ball 266 freely movably, the movable iron core 264 abutting at its utmost end against the check ball 266. The valve chamber 261 also is provided with a first port 267 communicating with the oil pump 100, a second port 268 communicating with the back chamber 204 of the piston 203 through the oil passage 205, and a drain port 269 communicating with an oil tank T. The solenoid 263 is energized to move the movable iron core 264 as shown by the dot-and-dash line in FIG. 11 and the check ball 266 shuts off the communication of first port 267 with the second port 268, at which time the second port 268 is open to the drain port 269. On the other hand, when the solenoid 263 is deenergized, pressure of lubricating oil fed from the oil tank T to the first port 267 through the oil pressure line 210, pushes the check ball 266 to allow the first port 267 to communicate with the second port 268, at which time the latter is shut off from the drain port 269.

Figure 12:
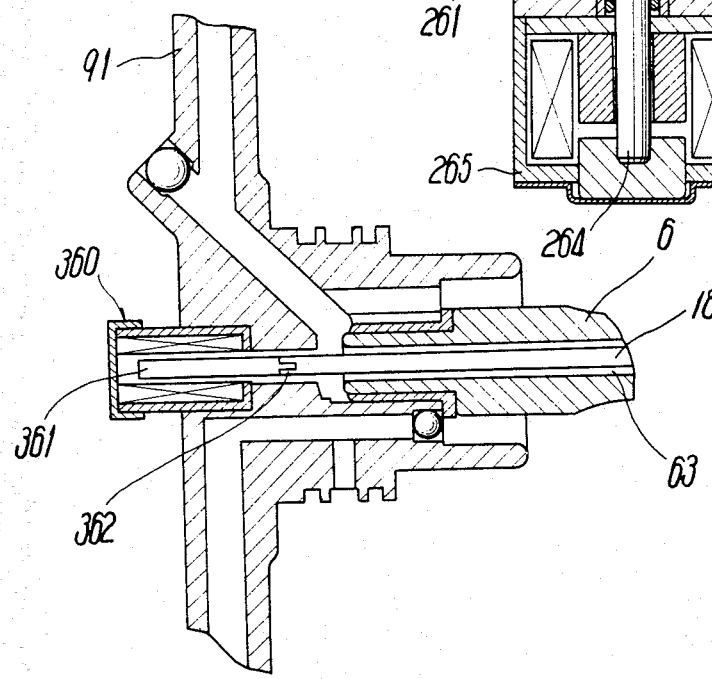

In addition, in FIG. 10, reference numeral 207 designates a spring interposed between the piston 203 and a spring seat 208 in a recess at the side cover 91, the spring 207 biasing the operating rod 18 in the direction of opening the on-off valve 17, so that the valve 17 is open when the solenoid 263 is energized to shut off the first port 267 from the second port 268 and allow the latter to communicate with the drain port 269.

Where no actuator is used and the operating rod 18 is coupled directly with the solenoid 360, the side cover 91, as shown in FIG. 12, carries the solenoid 360, whose movable iron core 361 is connected in association with the operating rod 18 by use of a pin 362.

As seen from the above, the lockup control device of the invention uses the car speed detector and suction pipe negative pressure detector to engage the lockup clutch only when the car speed and suction-pipe negative pressure are equal to or more than the predetermined values respectively. Hence, the lockup control device is simple in construction and can control the lockup clutch to engage or disengage at an approximate value of rotational speed ratio corresponding to the torque ratio of 1 or less.

Hence, it is possible to eliminate the inconvenience such that the lockup is carried out in the area where the torque ratio of 1 or more is to function to increase torque, or no lockup in the area where a power transmission loss is created due to the torque ratio lower than 1. Also, the lockup control device is controllable in comparison of the car speed signal with the negative pressure signal, thereby being simple in construction and inexpensive to produce as it does not require a complex arithmetic unit of a computer.

Although several embodiments have been described, they are merely exemplary of the invention and not to be constructed as limiting, the invention being defined solely by the appended claims.

What is claimed is:

1. A lockup control device for a torque converter provided with a pump coupled with an output shaft of an engine and a turbine coupled with an input shaft of a transmission gear, comprising:

a lockup clutch for connecting said pump directly with said turbine at said torque converter, said lockup clutch comprising a clutch piston, a clutch disc engageable therewith, and a lockup clutch control chamber which is positioned between the piston and the disc and controls the engagement of said piston with said disc;

a clutch operating device provided with a control member for engaging or disengaging said clutch;

an operating member for operating said control member, said input shaft coupling with said turbine being provided with an oil passage having a drain, said oil passage communicating with said lockup clutch control chamber and having an on-off valve for opening or closing said drain;

an actuating device for electrically actuating said operating member, said actuating device being provided with a car speed detector for detecting a car speed to output a plurality of car speed signals, a negative pressure detector for detecting a negative pressure in a suction pipe at said engine, and an actuating member which electrically actuates said operating member in response to said car speed signals and negative pressure signals output from said car speed and negative pressure detectors, so that said clutch is engaged when said car speed is greater than or equal to a predetermined speed and said suction pipe negative pressure is greater than or equal to a predetermined pressure, and is disengaged when said car speed is less than said predetermined speed and said suction pipe negative pressure is less than said predetermined pressure; and said input shaft extending in axial alignment with said output shaft so that said transmission gear is incorporated with the extension of said input shaft, said input shaft being supported at one axial end thereof to a side cover of a transmission case housing therein said transmission gear, and having an insertion bore in continuation of said oil passage and open at the axial end of said input shaft at the side cover side, said insertion bore supporting an operating rod acting as said operating member which controls said on-off valve to open and close the same.

2. A lockup control device according to claim 1, wherein said operating rod is provided with a piston, said clutch operating device comprising said rod and said on-off valve, includes a pressure line for actuating said piston, said actuating member at said actuating device being interposed in said pressure line.

3. A lockup control device according to claim 2, wherein said piston is formed of a diaphragm.

4. A lockup control device according to claim 3, wherein said side cover at said transmission case has a box-like shaped case open at one end, so that said case press-holds said piston formed of said diaphragm, at the circumferential edge thereof.

5. A lockup control device according to claim 2, wherein said pressure line includes a negative pressure pipe communicating with a negative pressure area at said suction pipe of said engine, said actuating member comprising a solenoid operated directional control valve which directionally changes over said pressure line to said negative pressure pipe and the atmosphere.

6. A lockup control device according to claim 2, wherein said pressure line is an oil passage connecting with a lubricating oil pressure line which feeds a lubricating oil to said transmission gear on said input shaft, said actuating member comprising a hydraulic and solenoid operated directional control valve.

7. A lockup control device according to claim 1, wherein said actuating device for actuating said operating member at said clutch operating device includes a shift detector which outputs a shift signal when said transmission gear is shifted into a drive range.

* * * * *